(12) United States Patent
Lee

(10) Patent No.: US 6,246,554 B1
(45) Date of Patent: Jun. 12, 2001

(54) SURGE PROTECTOR FOR A VIDEO DISPLAY APPARATUS

(75) Inventor: Sang-Young Lee, Suwon (KR)

(73) Assignee: Samsung Electronics Co., Ltd., Suwon (JP)

( * ) Notice: Subject to any disclaimer, the term of this patent is extended or adjusted under 35 U.S.C. 154(b) by 0 days.

(21) Appl. No.: 09/347,401

(22) Filed: Jul. 6, 1999

(30) Foreign Application Priority Data

Jul. 7, 1998 (KR) .................................. 98-27371

(51) Int. Cl.[7] ................................................. H02H 7/00
(52) U.S. Cl. ............................. 361/18; 315/370; 348/607
(58) Field of Search .................................. 361/18, 21, 20; 315/370, 364, 388; 348/377, 378, 607; 307/96, 106, 107, 108; 323/282, 283

(56) References Cited

U.S. PATENT DOCUMENTS

| | | | |
|---|---|---|---|
| 5,079,666 * | 1/1992 | Najm | 361/85 |
| 5,491,794 * | 2/1996 | Wu | 714/23 |
| 5,627,437 * | 5/1997 | Kim | 315/399 |
| 5,917,716 * | 6/1999 | Cho | 363/21 |
| 5,944,830 * | 8/1999 | Hong et al. | 713/324 |
| 6,005,789 * | 12/1999 | Lee | 363/95 |
| 6,020,694 * | 2/2000 | Shim | 315/387 |
| 6,043,814 * | 3/2000 | Lim | 345/326 |
| 6,100,935 * | 8/2000 | Inoue | 348/526 |

* cited by examiner

Primary Examiner—Michael J. Sherry
Assistant Examiner—Kim Huynh
(74) Attorney, Agent, or Firm—Robert E. Bushnell, Esq.

(57) ABSTRACT

In a surge protector for a video display apparatus capable of preventing the video display apparatus from malfunctioning due to drastically changing high voltage, a microcomputer receives H/V sync signals, control signals and outputs a switching control signal. A switching signal generator outputs a switching signal in response to the H/V sync signals and the switching control signals. A switching circuit receives first and second voltages and outputs the second voltage in response to the switching signal and selectively enables a path of the second voltage from the switching circuit in response to the loop control signal. A high voltage generator generates a high voltage in response to the second voltage. A constant-voltage circuit compares the high voltage from the high voltage generator with a predetermined reference voltage and generates a constant-voltage control signal for controlling a duty cycle of the second voltage. A surge voltage protecting circuit supplies the control signal to the microcomputer and the switching circuit in response to the constant-voltage control signal. Accordingly, a voltage being supplied to a transformer of the high voltage generator maintains an uniform voltage level even though the voltage level of the high voltage is drastically changed due to the discharge of the cathode-ray tube or external circumstances. Therefore, it is able to prevent the video display apparatus from malfunctioning.

9 Claims, 3 Drawing Sheets

SURGE PROTECTOR FOR A VIDEO DISPLAY APPARATUS

CLAIM OF PRIORITY

This application makes reference to, incorporates the same herein, and claims all benefits accruing under 35 U.S.C. §119 from my application CIRCUIT FOR PROTECTING A SURGE VOLTAGE OF A VIDEO DISPLAY APPARATUS filed with the Korean Industrial Property Office on Jul. 7, 1998 and there duly assigned Ser. No. 27371/1998 by that Office.

BACKGROUND OF THE INVENTION

1. Field of the Invention

The present invention relates to a video display apparatus, and more particularly, to a surge protector for the video display apparatus capable of preventing the video display apparatus from malfunctioning due to a drastic change of high voltage from a discharge of a cathode-ray tube or external circumstances.

2. Description of the Prior Art

In general, in a video display apparatus which adopts the cathode-ray tube using a high voltage, such as a monitor of a computer system, a surge voltage is often generated due to a display mode change, a power source on/off or a display power management system mode change operation.

An earlier high voltage generating circuit of the video display apparatus has a microcomputer for receiving horizontal and vertical sync signals H-SYNC and V-SYNC (hereinafter, referred to as H/V sync signals) and a plurality of control signals, a horizontal/vertical processor (hereinafter, referred to as an H/V processor) for generating horizontal and vertical oscillation signals in response to H/V sync signals H-SYNC and V-SYNC from the microcomputer to output a switching signal, a switching circuit for outputting an external voltage Vcc in response to a switching signal, a high voltage generator for amplifying the voltage Vcc from the switching circuit to supply a high voltage to a cathode-ray tube CRT, and a constant-voltage circuit for comparing a voltage signal from the high voltage generator with a predetermined reference voltage and for outputting a constant-voltage control signal to control a duty cycle of the voltage Vcc supplied to the high voltage generator.

If the voltage signal is higher than the predetermined reference voltage, the output voltage Vcc which is supplied to the high voltage generator goes down because the duty cycle of the voltage Vcc decreases due to the constant-voltage control signal.

On the contrary, if the voltage signal is lower than the predetermined reference voltage, the output voltage Vcc which is supplied to high voltage generator goes up because the duty cycle of the voltage Vcc increases due to the constant-voltage control signal. Accordingly, the high voltage generated by high voltage generator usually maintains a uniform voltage level.

However, if the high voltage supplied to the cathode-ray tube is drastically reduced by impurities inside the cathode-ray tube or other factors, the voltage level of the high voltage from the high voltage generator lowers. As a result, since the voltage level of the voltage signal inputted to the constant-voltage circuit lowers, the duty cycle of the voltage Vcc increases due to the constant-voltage control signal from the constant-voltage circuit.

According, an overcurrent flows from the switching circuit to the high voltage generator and the high voltage generator malfunctions due to the overcurrent.

SUMMARY OF THE INVENTION

Therefore, it is an object of the present invention to provide a surge protector for a video display apparatus capable of preventing the video display apparatus from malfunctioning due to a drastic change of high voltage from a discharge of a cathode-ray tube or external circumstances.

In order to achieve the above object, the present invention provides a surge protector for a video display apparatus, the surge protector comprising: a controller for outputting horizontal and vertical sync signals and a plurality of control signals and for outputting a switching control signal in response to an external control signal; a switching signal generator for outputting a switching signal in response to the horizontal and vertical sync signals and the switching control signal from the controller; a switching circuit for receiving first and second external voltages, and for outputting the second voltage in response to the switching signal and for selectively enabling a path of the second voltage from the switching circuit in response to the external control signal; a high voltage generator for generating a high voltage in response to the second voltage inputted from the switching circuit; a constant-voltage circuit for comparing the high voltage from the high voltage generator with a predetermined reference voltage and for generating a constant-voltage control signal for controlling a duty cycle of the second voltage of the switching circuit in response thereto; and a surge voltage protector for respectively supplying the control signal for controlling the path of the second voltage to the controller and the switching circuit in response to the constant-voltage control signal.

In the surge protector for the video display apparatus according to the present invention, the duty cycle of the path for supplying a voltage to a transformer of the high voltage generator is controlled by the voltage level of the constant-voltage control signal which is generated based on the compared value between the voltage level of the voltage signal inputted from the transformer of the high voltage generator and the voltage level of the reference voltage. Accordingly, the voltage being supplied to the transformer of the high voltage generator maintains an uniform voltage level even though the voltage level of the high voltage is drastically changed due to the discharge of the cathode-ray tube or external circumstances. Therefore, the video display apparatus is prevented from malfunctioning.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A description will be given below in detail with reference to the accompanying drawings to a configuration and an operation of a surge protector for a video display apparatus according to an embodiment of the present invention.

Figure 1:
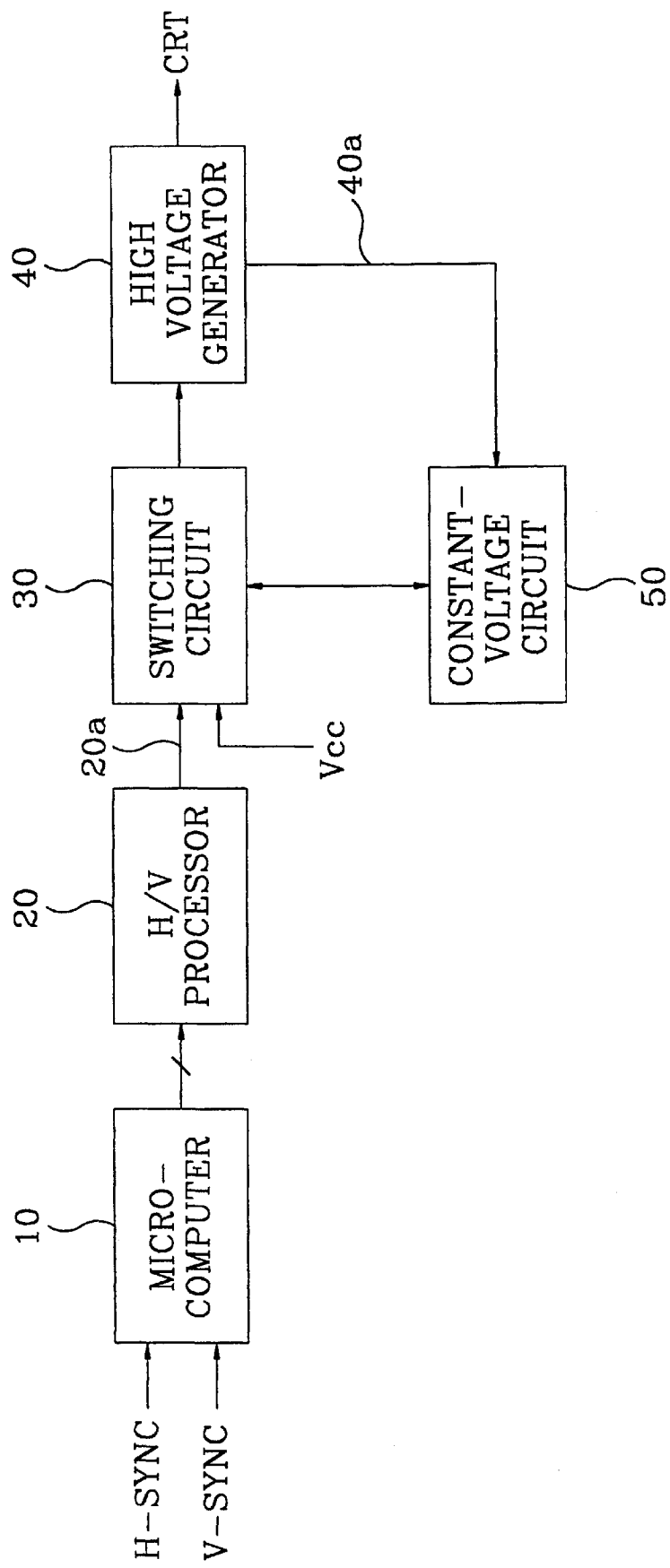
FIG. 1 is a block diagram showing the configuration of a high voltage generating circuit of a video display apparatus.

FIG. 1 is a block diagram showing the configuration of the high voltage generating circuit of a video display apparatus discussed in the Description of the Related Art above.

In FIG. 1, a microcomputer 10 is connected to a horizontal/vertical processor 20 whose output 20a feeds a switching circuit 30. The voltage Vcc is also supplied to the switching circuit. The output of the switching circuit feeds a high voltage generator 40. The high voltage output of the high voltage generator feeds a CRT (not shown). A feedback voltage 40a from the high voltage generator feeds a constant voltage circuit 50 whose output in turn is supplied to the switching circuit 30.

Figure 2:
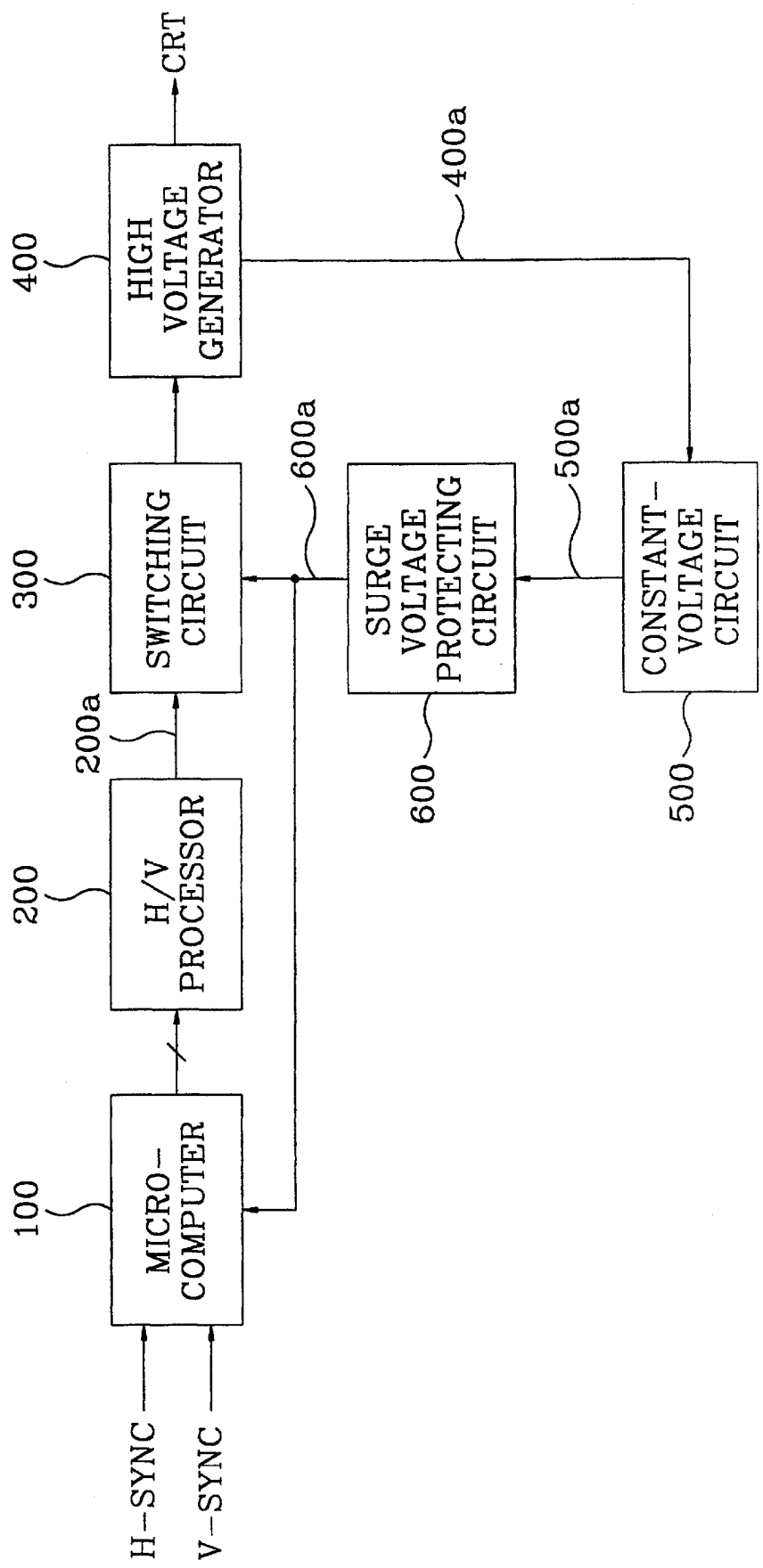
FIG. 2 is a block diagram showing the configuration of a surge protector for a video display apparatus according to the present invention.

FIG. 2 is a block diagram showing the configuration of a surge protector for a video display apparatus according to the present invention. Referring to FIG. 2, the surge protector has a microcomputer 100 for receiving H/V sync signals H-SYNC and V-SYNC and a plurality of control signals and for outputting a switching control signal in response to a control signal 600a, a horizontal/vertical processor 200 (hereinafter, referred to as an H/V processor) for outputting a switching signal 200a in response to H/V sync signals H-SYNC and V-SYNC and the switching control signal, a switching circuit 300 for receiving first and second voltages Vcc1 and Vcc2, and for outputting the second voltage Vcc2 in response to switching signal 200a and for either enabling or disabling a path of the second voltage Vcc2 supplied to a high voltage generator 400 in response to the control signal 600a, a high voltage generator 400 for generating a high voltage in response to the second voltage Vcc2 inputted from the switching circuit 300, a constant-voltage circuit 500 for comparing a high voltage signal 400a from the high voltage generator 400 with a predetermined reference voltage and for generating a constant-voltage control signal 500a to control a duty cycle of the second voltage Vcc2 from the switching circuit 300 in accordance with the compared result, and a surge voltage protecting circuit 600, responsive to the constant-voltage control signal 500a, for respectively supplying the control signal 600a to the microcomputer 100 and switching circuit 300 to control the path of the second voltage Vcc2 which is supplied to the high voltage generator 400.

Figure 3:
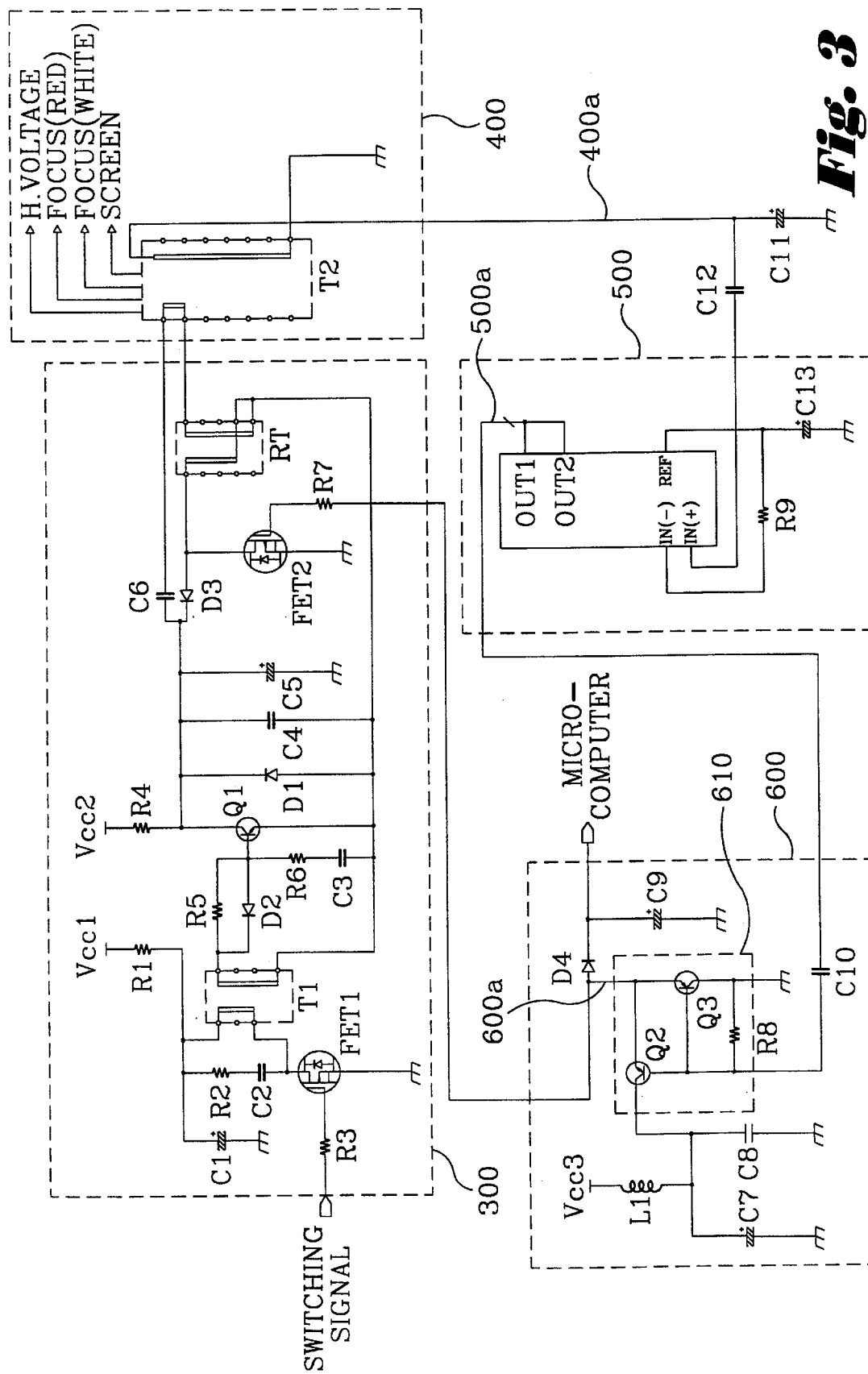
FIG. 3 is a circuit diagram showing the configuration of the surge protector for the video display apparatus according to the present invention shown in FIG. 2.

As shown in FIG. 3, the surge voltage protecting circuit 600 has a coupling capacitor C10 for outputting a coupling signal for determining either enabling time or disabling time of the path of the second voltage Vcc2 which is supplied from the switching circuit 300 to the high voltage generator 400 in response to the constant-voltage control signal 500a and a push-pull amplifier 610 for amplifying the coupling signal from the coupling capacitor C10 and supplying the coupling signal amplified by the push-pull amplifier 610 to the microcomputer 100 and switching circuit 300 as the loop control signal 600a.

In addition, the push-pull amplifier 610 has a n NPN transistor Q2 for receiving a third voltage Vcc3 and supplying a voltage signal corresponding to a voltage level of the third voltage Vcc3 to the microcomputer 100 and switching circuit 300 as control signal 600a in response to a voltage level of the coupling signal and a PNP transistor Q3 for supplying a voltage signal corresponding to a ground voltage level to the microcomputer 100 and the switching circuit 300 as control signal 600a in response to the voltage level of the coupling signal.

The control signal corresponding to the voltage level of the third voltage Vcc3 is a signal for enabling the path of second voltage Vcc2 and the control signal corresponding to the ground voltage level is a signal for disabling the path of second voltage Vcc2.

Also, the microcomputer 100 changes a duty cycle of the switching control signal in accordance with a voltage level of the control signal 600a from the surge voltage protecting circuit 600.

Hereinafter, a description will be given below in detail with reference to FIG. 3 to a configuration and an operation of the surge protector for the video display apparatus described above.

Referring to FIG. 3, if switching signal 200a from H/V processor 200 is inputted, a first field effect transistor FET1 is turned-on and a first voltage Vcc1 is supplied to a first coil of a first transformer T1.

Next, when a voltage induced in a second coil of the first transformer T1 by the first voltage Vcc1 supplied to the first coil thereof is supplied to a base terminal of a first transistor Q1, the first transistor Q1 is turned-on.

Since the voltage level of voltage signal 400a inputted from the high voltage generator 400 to the constant-voltage circuit 500 is lower than the voltage level of the reference voltage, the constant-voltage circuit 500 supplies a constant-voltage control signal 500a having a high voltage level to the surge voltage protecting circuit 600 to increase the duty cycle of the path of second voltage Vcc2.

If the coupling signal having the high voltage level from the coupling capacitor C10 of the surge voltage protecting circuit 600 is outputted in response to the constant-voltage control signal 500a from the constant-voltage circuit 500, the second transistor Q2 of the push-pull amplifier 610 is turned-on.

If the second transistor Q2 is turned-on, the third voltage Vcc3 supplied to a collector terminal of the second transistor Q2 is supplied as the control signal 600a to a gate terminal of a second field effect transistor FET2 of the switching circuit 300 and the microcomputer 100 through a emitter terminal thereof.

When the second field effect transistor FET2 is turned-on by the control signal 600a corresponding to the voltage level of third voltage Vcc3, a path of the second voltage Vcc2 is enabled.

When the second voltage Vcc2 is supplied to a first coil of a second transformer T2 of the high voltage generator 400 through a regulation transformer RT of the switching circuit 300, the high voltage generator 400 supplies a voltage from a second coil thereof to the cathode-ray tube (not shown) and a constant-voltage circuit 500.

In addition, the microcomputer 100 changes the duty cycle of the switching control signal supplied to the H/V processor 200 in response to the voltage level of the control signal 600a from the surge voltage protecting circuit 600.

In a case where the voltage level of the high voltage is drastically dropped due to the discharging of the cathode-ray tube, the surge protector for the video display apparatus executes a path control operation as described above.

First, third, fourth and seventh resistors R1, R3, R4 and R7 are bias control resistors, and a first capacitor C1, a first diode D1, a fourth capacitor C4, a fifth capacitor C5, a sixth capacitor C6 and a third diode D3 are respectively a rectification capacitor, a damper diode, a resonance capacitor, a voltage compensation capacitor, a pulse control capacitor and a diode for protecting the second field effect transistor FET2.

Also, a second resistor R2, a sixth resistor R6, a second capacitor C2 and a third capacitor C3 are devices to reduce the surge voltage.

On the contrary, if the voltage level of the voltage signal 400a from the high voltage generator 400 is higher than the voltage level of the reference voltage, the constant-voltage circuit 500 supplies a constant-voltage control signal 500a having a low voltage level to the surge voltage protecting circuit 600.

When the PNP third transistor Q3 of the push-pull amplifier 610 is turned-on, the voltage of the ground level supplied to a collector terminal of third transistor Q3 is supplied to a gate terminal of second field effect transistor FET2.

In addition, if the second field effect transistor FET2 is turned-off, the path of second voltage Vcc2 which is supplied to high voltage generator 400 from switching circuit 300 is disabled.

Accordingly, the second voltage Vcc2 supplied to the collector terminal of the first transistor Q1 does not supply the high voltage generator 400.

Seventh, eighth, ninth, eleventh and thirteenth capacitors C7, C8, C9, C11 and C13 are rectification capacitors, and a twelfth capacitor C12 is a coupling capacitor.

Also, an inductor L1 is a coil to remove noise from the third voltage Vcc3, and a ninth resistor R9 is a voltage control resistor.

In the present invention, the duty cycle of the path for supplying the voltage to the transformer of the high voltage generator is controlled by the voltage level of the constant-voltage control signal which is generated based on the compared value between the voltage level of the voltage signal inputted from the transformer of the high voltage generator and the voltage level of the reference voltage.

Accordingly, the voltage being supplied to the transformer of the high voltage generator maintains a uniform voltage level even though the voltage level of the high voltage is drastically changed due to the discharge of the cathode-ray tube or external circumstances. Therefore, the video display apparatus is prevented from malfunctioning.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A surge protector for a video display apparatus, said surge protector comprising:

a controller for receiving horizontal and vertical sync signals and a plurality of control signals and for outputting a switching control signal in response to a control signal;

a switching signal generator for outputting a switching signal in response to the horizontal and vertical sync signals and the switching control signal from said controller;

a switching circuit for receiving first and second external voltages, and for outputting the second voltage in response to the switching signal and selectively enabling a path of said second voltage from said switching circuit in response to said control signal;

a high voltage generator for generating a high voltage in response to the second voltage inputted from said switching circuit;

a constant-voltage circuit for comparing the high voltage from said high voltage generator with a predetermined reference voltage and for generating a constant-voltage control signal for controlling a duty cycle of the second voltage of said switching circuit in response thereto; and a surge voltage protector for respectively supplying the control signal from the surge voltage protector to said controller and said switching circuit in response to the constant-voltage control signal for controlling the path of the second voltage.

2. The circuit as claimed in claim 1, said surge voltage protector comprising:

a coupler for outputting a coupling signal for determining either a enabling time or a disabling time of the output path of the second voltage supplied from said switching circuit to said high voltage generator in response to the constant-voltage control signal; and an amplifier for amplifying the coupling signal from said coupler and supplying an amplified coupling signal to said controller and said switching circuit.

3. The circuit as claimed in claim 2, said coupler comprising is a coupling capacitor.

4. The circuit as claimed in claim 2, said amplifier comprising a push-pull amplifier.

5. The circuit as claimed in claim 4, said push-pull amplifier comprising.

a first transistor for receiving a third voltage and for supplying a voltage signal corresponding to a voltage level of the third voltage to said controller and said switching circuit as the control signal in response to a voltage level of the coupling signal; and a second transistor for supplying a voltage signal corresponding to a voltage level of a ground voltage to said controller and said switching circuit as the control signal in response to the voltage level of the coupling signal.

6. The circuit as claimed in claim 5, the control signal corresponding to the voltage level of the third voltage being supplied to said switching circuit to enable the path of the second voltage.

7. The circuit as claimed in claim 5, the control signal corresponding to the ground voltage level being supplied to said switching circuit to disable the path of the second voltage.

8. The circuit as claimed in claim 5, said first transistor comprising an NPN transistor and said second transistor comprising a PNP transistor.

9. The circuit as claimed in claim 1, said controller changing a duty cycle of the switching control signal in accordance with a voltage level of the control signal.

* * * * *